United States Patent Office 3,276,070
Patented Oct. 4, 1966

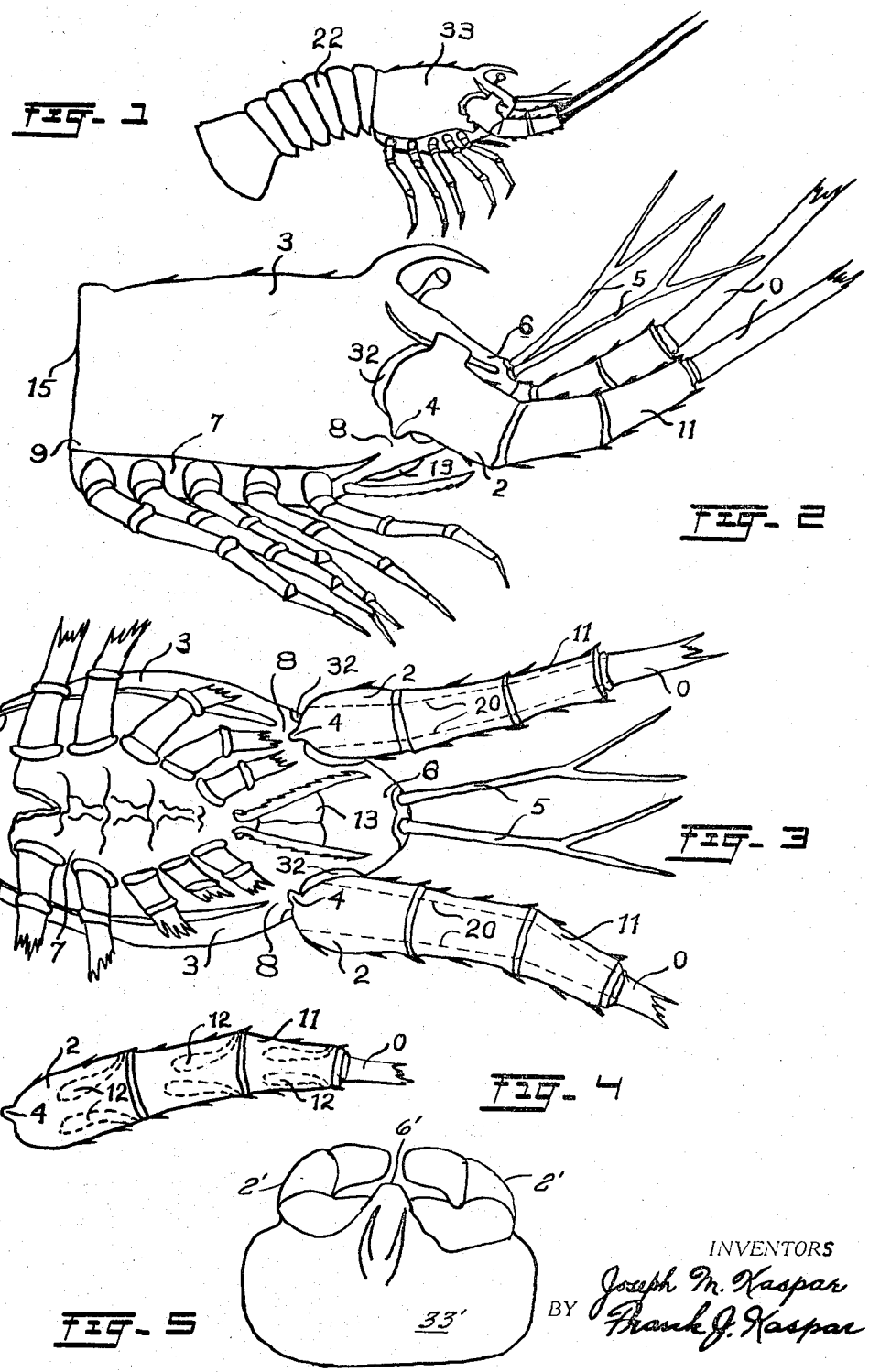

3,276,070
PROCESS FOR EXTRACTING RAW MEAT FROM SHELL OF BODY-SECTION OF THE SPINY LOBSTER
Joseph M. Kaspar and Frank J. Kaspar, both of 6750 SW. 8th St., Miami, Fla. 33144
Filed Jan. 11, 1965, Ser. No. 424,586
7 Claims. (Cl. 17—45)

This invention relates to a butchering process, and more specifically to the extraction of the raw meat from the shell of the body-section of the spiny lobster, which, due to the difficulty of extracting same from said shell under ordinary conditions and temperatures, has heretofore been discarded as waste by commercial shippers of raw lobsters.

The most important object of this invention is to extract the raw meat from the shell of the body-section of the spiny lobster in one piece, in prime condition and with a minimum of mutilation, so as to produce an attractive product for the market.

The second most important object of this invention is to introduce a new, delicious, tender, lobster portion to the seafood outlets. To our knowledge, the extracted raw meat from the shell of the body-section of the spiny lobster is not available for purchase in food markets anywhere.

A third object of this invention is to produce a new seafood whose delicate taste and gourmet quality can demand premium prices.

A fourth object of this invention is to provide a process whereby the raw meat from the shell of the body-section of the spiny lobster can be extracted manually with ordinary butchering cutlery, namely, a short bladed knife and hand shears, which have been modified slightly to suit this particular process.

The fifth object of this invention is to provide a process which makes possible the extraction of the raw meat from the shell of the body-section of the spiny lobster economically, by unskilled help. Anyone with seafood handling experience can become expert and rapid with practice.

The sixth object of this invention is to provide a process for extracting the raw meat from the shell of the body-section of the spiny lobster which does not require heat to accomplish this purpose. This delicate raw meat deteriorates rapidly when not refrigerated and when exposed to the slightest heat, takes on the appearance of being blanched or partially cooked. However, with our process, the meat remains at a safe, refrigerated temperature throughout the killing and the manual extraction from the shell, thus assuring a prime product suitable for freezing and storage.

The seventh object of this invention is to provide a process whereby the raw meat from the shell of the breast-section of the spiny lobster may also be extracted in one piece, in the same manner and using the same cutlery, but at a somewhat higher butchering cost than that of the body meat, due to the intricacy of the shell structure of the breast.

The raw meat from the shell of the body-section of the northern lobster can also be extracted in the same manner.

Still additional objects, benefits, advantages and the simplicity of this invention will become evident from a study of the following detailed description taken in conjunction with the accompanying drawing in which:

FIGURE 1 is a side view of a whole spiny lobster, to show clearly the tail-section and the body-section.

FIGURE 2 is an enlarged side view of the body-section.

FIGURE 3 is an enlarged bottom view of the body-section.

FIGURE 4 is an enlarged bottom view of set of antenna joints, showing tendons attached to inside of shell.

FIGURE 5 is a top view of the extracted meat from the body-section, folded and fastened to present an attractive seafood portion in the market.

All parts of the spiny lobster are edible except the shell, gills, stomach and the intestines.

The edible raw meat recoverable from the shell of the body-section of the spiny lobster, not including the liver, weighs more than one-half the weight of the meat in the tail-section. The liver is also an edible delicacy.

Our process involves exposing the whole lobster to sub-freezing temperatures until it has been killed and the soft new inner shell has separated from the hard outer shell. The "soft" new inner shell is the next stage of growth, after shedding the present hard shell and is comparable to a "soft" crab.

The length of time required to accomplish this will vary with the capacity of the refrigeration unit and the amount and temperature of the live lobsters being conditioned at one time but experience in timing or simply testing will show when the meat has separated from the shell. However, the lobster should not be allowed to freeze, as once-frozen meat should not be re-frozen.

Meat from lobsters which have been frozen and thawed can also be extracted from the shell by this method, but the cost of freezing and the time lost in thawing have been wasted and the meat cannot again be safely refrozen.

This process is effective regardless of the lobster's stage of readiness for shedding of the present hard shell. The meat can even be extracted from the "paper-shell" stage of a lobster (recently shed).

The meat removed from the shell of the body-section of the spiny lobster is tenderer than the meat from the tail-section and has a promising potential to be marketed as a plain, frozen seafood, ready to be seasoned and cooked to order, or it can be breaded or otherwise prepared and seasoned, ready-to-fry, or better still, it can be marketed already cooked as a TV dinner.

Raw lobster, freshly cooked, has a decided taste advantage over the reheated taste of most lobster dishes prepared from boiled lobster which has been frozen.

When the lobster is properly conditioned, the whips O are broken off and the tail-section 22 is wrung from the body-section 33. With a stout knife, having a short blade, the skin 32 that joins the antenna 2 to the cape 3, is cut and the hinge 4 of the antenna 2 is disjointed with a prying action of the knife blade. This operation is repeated on the other antenna.

The knife is used to cut the shell of the nose 6 above and below the feelers 5 that protrude from the nose. The feelers are pulled out and discarded.

The lobster body-section is laid on its back and the shell connections on both sides of the body are cut at positions 8 and 9, where the cape 3 joins the breast-plate shell 7.

A knife-cut is made around the inside of cape 3 through the tail opening 15 to start the separation of the soft new shell from the hard cape shell.

Next, shears are used to cut an opening, dotted lines 20, on the underside of the three antenna joints and wide enough to permit the extraction of the meat. Beginning at front end of the smallest antenna joint 11, and working toward the cape 3, the partially opened shears are used to push the meat off the tendons 12, which are attached to the inside of the shell. When the meat is completely free of the antenna shell, but still connected to the body, the antenna shell is twisted off and discarded. This operation is repeated on the opposite side.

The cape 3 is held in the left hand with the nose 6 down on the table, two fingers of the right hand are then inserted between the hard cape shell 3 and the new soft shell, this frees the meat down to the nose 6, and the cape 3 can be lifted off and discarded.

With the tail-end of the body shell 15 on the table and the left hand holding the jaw shells 13, the dull knife edge is used to separate the meat from the shell to a point beyond the mouth where the ligaments to the tail muscles are exposed.

With the knife used as a pry bar between the base of the jaws 13 and the breast-plate 7, the branched ends of the ligaments can be pulled from the muscle. Then the stomach can be withdrawn from the body cavity intact with the jaw shells.

With breast-plate 7 in the left hand and the body-meat hanging from the body cavity, the dull side of the knife is used to pinch the muscles from the ligaments which are attached to the front end of the breast-plate shell.

After the meat is free from the shell, the liver is gently separated and saved and the intestines are discarded.

After washing the body meat in cold water, the meat is dipped into a sodium bisulfite solution to prevent the formation of "black spot," that is, the darkening of the meat and juices.

To prepare the meat for display, the loose ends of the muscles are placed inside the body cavity and the tail-end of the soft cape is folded under and toward the nose and fastened with toothpicks or otherwise. As can be seen in FIGURE 5, the meat from both antennae is designated by the numeral 2' and are fastened against the body meat 33' with the distal ends of the antennae meat converging toward the nose point 6' of the body meat.

It is obvious that changes can be made in this process without departing from the principles involved and it is accordingly understood that the invention is not limited to the exact process described, but is understood to be fully as broad as defined by the appended claims.

Having thus completely and fully described the invention, what is now claimed as new and desired to be protected by Letters Patent of the United States is:

1. The process of extracting raw meat from the shell of the body-section of the spiny lobster by manual means, comprising the steps of chilling the lobster until the soft inner shell has separated from the hard outer shell, and then removing the meat from the hard outer shell manually by hand tools.

2. The process for the extraction of the raw meat from the shell of the body-section of the spiny lobster by manual means, comprising the steps of first chilling a live lobster until it is dead and the soft inner shell has separated from the hard outer shell, and, thereafter, with the lobster being in a relaxed state, removing the tail-section from the body-section and, thereafter, removing the meat from the hard outer shell manually by hand tools.

3. A process for the extraction of the raw meat from the shell of the body-section of the spiny lobster by manual means, killing a live lobster, chilling the lobster until the soft inner shell has separated from the hard outer shell but not freezing the lobster and, thereafter, removing the meat from the hard outer shell of the lobster.

4. A process for the extraction of the raw meat from the shell of the body-section of the spiny lobster by manual means, comprising the steps of first, killing a lobster, second, placing the lobster body-section in a freezing ambient temperature and holding it in said ambient temperature until the hard outer shell has separated from the soft inner shell and, thereafter, removing the lobster from said ambient temperature and then removing the meat from the hard outer shell by manual means using butchering cutlery.

5. The raw meat article of a process for the extraction of the raw meat from the shell of the body-section of the spiny lobster by manual means, after the lobster tail-section has been removed and the body-section has been chilled until the soft inner shell has separated from the hard outer shell, and the meat from the hard outer body-section shell has been removed manually by hand tools.

6. A process for the extraction of the raw meat from the shell of the body-section of the spiny lobster by manual means, and by unskilled help, comprising the steps of: chilling the lobster body-section until the soft inner shell of the body has separated from the hard outer shell, and, after the tail has been removed and the whips have been broken off, removing the meat from the shell manually by hand tools in the following steps: first, for each main antenna, severing the skin which connects the antenna at the cape and disjointing the hinges which connect the antenna to the cape; second, cutting the shell of the nose from the cape above and below the feelers and, then, pulling the feelers out of the nose; cutting the connection portion of the shell between the breast plate and the cape at the two forward parts of the body and at the rearward parts of the body; and pulling the body meat, including the soft inner shell from the hard outer shell beginning at the tail opening and prying the meat out of the cape and toward the front opening.

7. The process as set forth in claim 6 wherein, before the body meat is pulled from the hard outer shell, and after the breast plate has been cut from the cape, cutting a first and a second longitudinal extending slit along the underside of each antenna in spaced relation, and between the tendons of the antenna so that the meat of the antennae is adapted to be forced in a string-like configuration from the shell of the antenna with the tendons remaining attached to the shell, the perpendicular distance between the slits being sufficient for removal of the meat through the ribbon-like opening defined by the slits.

No references cited.

SAMUEL KOREN, *Primary Examiner.*

LUCIE H. LAUDENSLAGER, *Examiner.*